(12) United States Patent
Lefebvre et al.

(10) Patent No.: US 12,188,364 B2
(45) Date of Patent: Jan. 7, 2025

(54) DAMPER SEGMENT FOR PRESSURIZED GAS PIPE OF AIRCRAFT ENGINE

(71) Applicant: PRATT & WHITNEY CANADA CORP., Longueuil (CA)

(72) Inventors: Guy Lefebvre, St-Bruno-de-Montarville (CA); Remy Synnott, Varennes (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 373 days.

(21) Appl. No.: 17/858,293

(22) Filed: Jul. 6, 2022

(65) Prior Publication Data

US 2024/0011415 A1    Jan. 11, 2024

(51) Int. Cl.

| | |
|---|---|
| *F01D 25/16* | (2006.01) |
| *F01N 13/18* | (2010.01) |
| *F16L 27/10* | (2006.01) |
| *F16L 27/107* | (2006.01) |
| *F16L 51/02* | (2006.01) |
| *F01D 9/02* | (2006.01) |

(52) U.S. Cl.
CPC ........ *F01D 25/162* (2013.01); *F01N 13/1811* (2013.01); *F16L 27/1004* (2013.01); *F16L 27/107* (2013.01); *F16L 51/025* (2013.01); *F01D 9/026* (2013.01); *F01N 2310/14* (2013.01); *F05D 2220/323* (2013.01); *F05D 2260/39* (2013.01); *F05D 2260/96* (2013.01)

(58) Field of Classification Search
CPC ........ F01D 25/162; F01D 9/026; F01D 25/30; F01D 5/26; F01D 25/04; F01N 13/1811; F01N 2310/14; F01N 2340/02; F01N 2470/00; F01N 5/04; F16L 27/1004; F16L 27/107; F16L 51/025; F16L 27/12; F16L 27/111; F16L 51/026; F05D 2220/323; F05D 2260/39; F05D 2260/96; F05D 2220/324; F02C 7/04; F02C 6/12
See application file for complete search history.

(56) References Cited

U.S. PATENT DOCUMENTS

| | | | |
|---|---|---|---|
| 2,385,366 | A | 9/1945 | Lysholm |
| 2,470,989 | A | 5/1949 | Keller et al. |

(Continued)

FOREIGN PATENT DOCUMENTS

| | | |
|---|---|---|
| CN | 107725195 | 2/2019 |
| DE | 19936170 | 2/2001 |

(Continued)

*Primary Examiner* — Xiao En Mo
(74) *Attorney, Agent, or Firm* — Norton Rose Fulbright Canada LLP

(57) ABSTRACT

The damper segment can be assembled between adjacent segments of a pressurized gas pipe of an aircraft engine. The damper segment can have a proximal end, a distal end, a rigid tube at the proximal end, a damper tube extending between the rigid tube and the distal end, the damper tube being made of a metal mesh, a proximal catch structurally connecting a proximal end of the damper tube to the rigid tube, and a distal catch structurally connected between a distal end of the damper tube and the distal end, the damper tube having an unsupported length extending between the distal catch and the proximal catch, the rigid tube having a liner portion projecting into the distal segment, the liner portion extending internally relative the damper tube.

20 Claims, 4 Drawing Sheets

(56) References Cited

U.S. PATENT DOCUMENTS

| | | | |
|---|---|---|---|
| 2,801,043 | A | 7/1957 | Spotz et al. |
| 3,396,906 | A | 8/1968 | Newton |
| 4,996,839 | A | 3/1991 | Wilkinson et al. |
| 5,145,215 | A | 9/1992 | Udell |
| 6,783,321 | B2 | 8/2004 | Lathrop et al. |
| 7,074,009 | B2 | 7/2006 | Allmang et al. |
| 7,147,433 | B2 | 12/2006 | Ghizawi |
| 9,328,738 | B2 | 5/2016 | Yokoyama et al. |
| 9,835,165 | B2 | 12/2017 | Jinnai et al. |
| 10,030,581 | B2 | 7/2018 | Gekht et al. |
| 10,428,986 | B2 * | 10/2019 | Yeandel ................ F16L 51/027 |
| 2014/0212277 | A1 | 7/2014 | Uesugi |
| 2015/0056065 | A1 | 2/2015 | Takama et al. |
| 2020/0182261 | A1 | 6/2020 | Ogawa et al. |

FOREIGN PATENT DOCUMENTS

| | | |
|---|---|---|
| EP | 0989289 A1 | 3/2000 |
| EP | 1026375 B1 | 6/2005 |
| GB | 571022 | 8/1945 |
| GB | 688111 | 2/1953 |

\* cited by examiner

DAMPER SEGMENT FOR PRESSURIZED GAS PIPE OF AIRCRAFT ENGINE

TECHNICAL FIELD

The application relates generally to gas turbine engines and, more particularly, to gas pipe elements thereof.

BACKGROUND OF THE ART

Aircraft engines can use piping to convey pressurized gas, such as exhaust gasses or compressed air, from an outlet of a first component to an inlet of a second component. The design of such piping can represent surprisingly complex challenges when taking into consideration factors such as structural resistance, temperature and pressure, limiting weight, and managing dynamic structural effects such as vibrations. There always remains room for improvement.

SUMMARY

In one aspect, there is provided an aircraft engine comprising a combustion engine having an engine intake and an exhaust gas outlet; a gas turbine having a gas turbine intake; an exhaust pipe fluidly connecting the exhaust gas outlet to the gas turbine intake, the exhaust pipe having a length defined between the exhaust gas outlet and the gas turbine intake and an exhaust gas path extending inside the exhaust pipe along the length, the exhaust pipe having a damper segment located along a portion of the length, the damper segment having a proximal end secured to a proximal segment and directed towards the combustion engine relative the internal exhaust gas path, a distal end secured to a distal segment and directed towards the gas turbine intake along the exhaust gas path, a rigid tube at the proximal end, a damper tube extending between the rigid tube and the distal end, the damper tube being made of a metal mesh, a proximal catch connecting a proximal end of the damper tube to the rigid tube, and a distal catch structurally connected between a distal end of the damper tube and the distal segment, the damper tube having an unsupported length extending between the distal catch and the proximal catch, the rigid tube having a liner portion projecting into the distal segment, the liner portion extending internally relative the damper tube.

In another aspect, there is provided an aircraft engine comprising a combustion engine having an engine intake and an exhaust gas outlet; a compressor having a compressor outlet; an intake pipe fluidly connecting the compressor outlet to the engine intake, the intake pipe having a length defined between the compressor outlet and the engine intake and an intake gas path extending inside the intake pipe along the length, the intake pipe having a damper segment located along a portion of the length, the damper segment having a proximal end secured to a proximal segment and directed towards the compressor outlet relative the internal gas path, a distal end secured to a distal segment and directed towards the engine intake along the gas path, a rigid tube at the proximal end, a damper tube extending between the rigid tube and the distal end, the damper tube being made of a metal mesh, a proximal catch connecting a proximal end of the damper tube to the rigid tube, and a distal catch structurally connected between a distal end of the damper tube and the distal segment, the damper tube having an unsupported length extending between the distal catch and the proximal catch, the rigid tube having a liner portion projecting into the distal segment, the liner portion extending internally relative the damper tube.

In a further aspect, there is provided a damper segment for assembly between adjacent segments of a pressurized gas pipe relative to a pressurized gas path, the damper segment comprising: a proximal end, a distal end, a rigid tube at the proximal end, a damper tube extending between the rigid tube and the distal end, the damper tube being made of a metal mesh, a proximal catch structurally connecting a proximal end of the damper tube to the rigid tube, and a distal catch structurally connected between a distal end of the damper tube and the distal end, the damper tube having an unsupported length extending between the distal catch and the proximal catch, the rigid tube having a liner portion projecting into the distal segment, the liner portion extending internally relative the damper tube.

DESCRIPTION OF THE DRAWINGS

Reference is now made to the accompanying figures in which.

DETAILED DESCRIPTION

Figure 1:
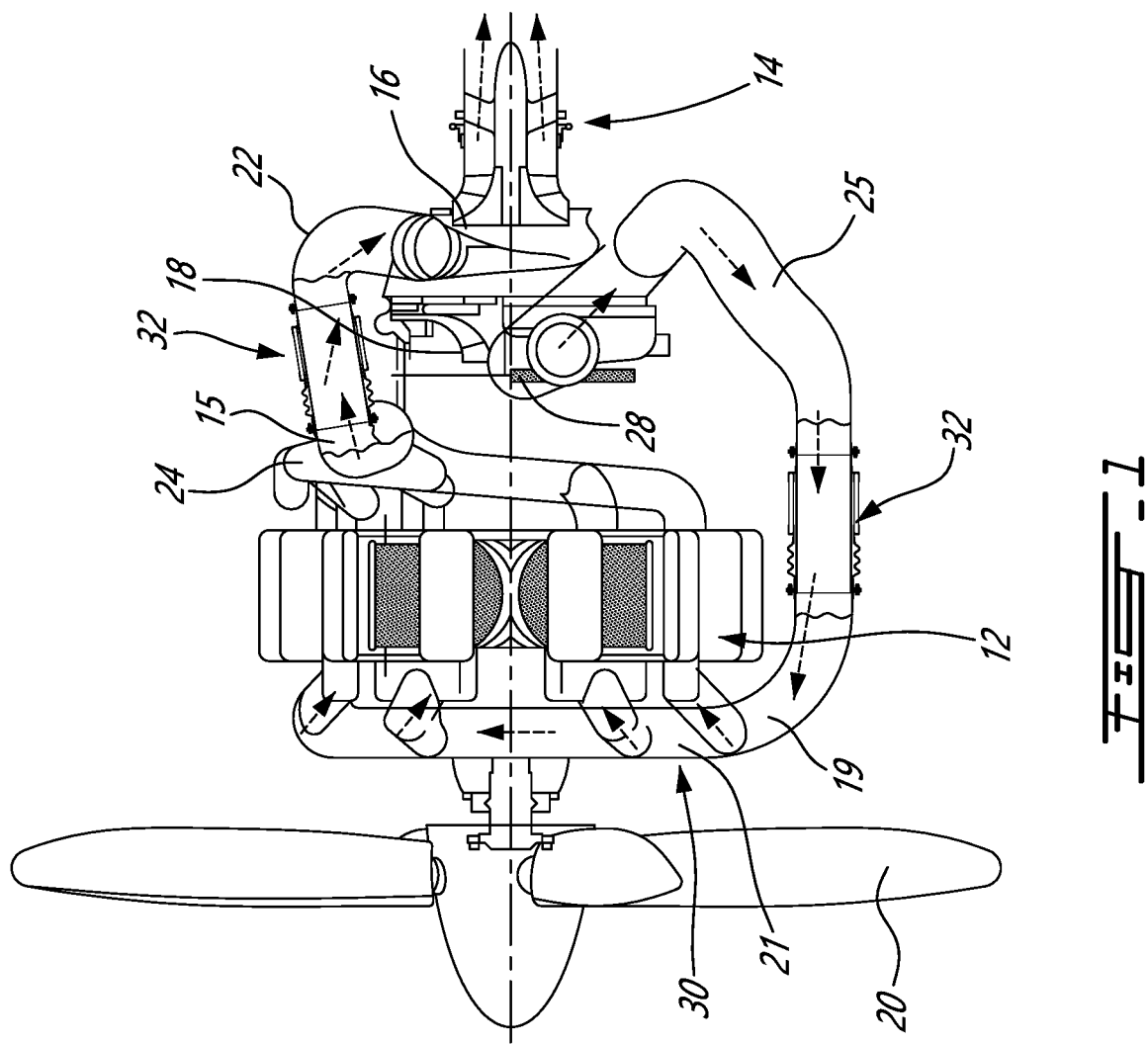
FIG. 1 is a schematic cross-sectional view of a gas turbine engine.

FIG. 1 illustrates an aircraft gas turbine engine 10 of a type preferably provided for use in subsonic flight, generally comprising a combustion engine 12 in which compressed air is mixed with fuel and ignited delivering mechanical power and exhaust gasses. The exhaust gasses are collected from an exhaust gas outlet 15 of the combustion engine 12 and directed to an intake 16 of a gas turbine 14 via an exhaust pipe 22. The exhaust pipe 22 can be said to define an exhaust gas path extending inside it along its length. The gas turbine 14 can convert energy in the form of heat, pressure and/or velocity of the exhaust gasses into angular velocity of a rotor, and the rotor can be used to direct power to one or more other device, such as a compressor 18, a propulsor 20 (e.g. propeller, fan), and/or an electric machine acting as a generator (not shown). The transfer of power can be direct, or via a clutch and/or a gearbox. The gas turbine 14 is optional.

In this embodiment, a compressor 18 is provided. The compressor 18 can be a centrifugal compressor for instance, and be used to boost the pressure of air from the environment in order to feed higher pressure air to the intake 19 of the combustion engine 12. More specifically, compressed air can be collected from the compressor 18 by an intake pipe 25, via a scroll 28 for instance, and fed to the intake 19 of the combustion engine 12. The intake pipe 25 can be said to define an intake gas path extending inside it along its length. The compressor 18 can be powered by the gas turbine 14, by the combustion engine 12, and/or by an auxiliary electric engine, to name some examples. The compressor 18 is optional.

In the illustrated embodiment, the combustion engine 12 can have one or more combustion engine units such as piston engine units, and/or Wankel engine units for instance. The compressed air conveyed along the intake path can be distributed to a plurality of the engine units via an intake manifold 21 which can connect the intake pipe 25 to individual engine units. The exhaust gasses can be collected from a plurality of sources associated to corresponding engine units via an exhaust manifold 24 which connects the exhaust pipe 22 to individual engine units. The intake pipe 19 can convey a linear flow of compressed air whereas the compressor 18 can be configured for outputting a circumferential flow of compressed air, and the intake pipe 25 can be connected tangentially to the compressor outlet. A device commonly referred to as a scroll 28 can be provided to provide the radial to tangential transition. The exhaust pipe 22 can convey a linear flow of exhaust gasses, whereas the gas turbine 14 can be configured for receiving an annular stream of exhaust gasses. A gas turbine intake 16 can be provided for connecting the exhaust conduit 22 to the gas turbine 14. The gas turbine intake 16 can be configured for receiving the linear flow of exhaust gasses from the exhaust pipe 22, distributing it circumferentially, re-orienting its velocity from a circumferential to an axial orientation, and feeding it as an axially-oriented annular stream to the gas turbine 14. In an alternate embodiment, the gas turbine 14 can be centrifugal to axial gas turbine 14 and have a radially oriented inlet and an axially oriented outlet.

Figure 2:
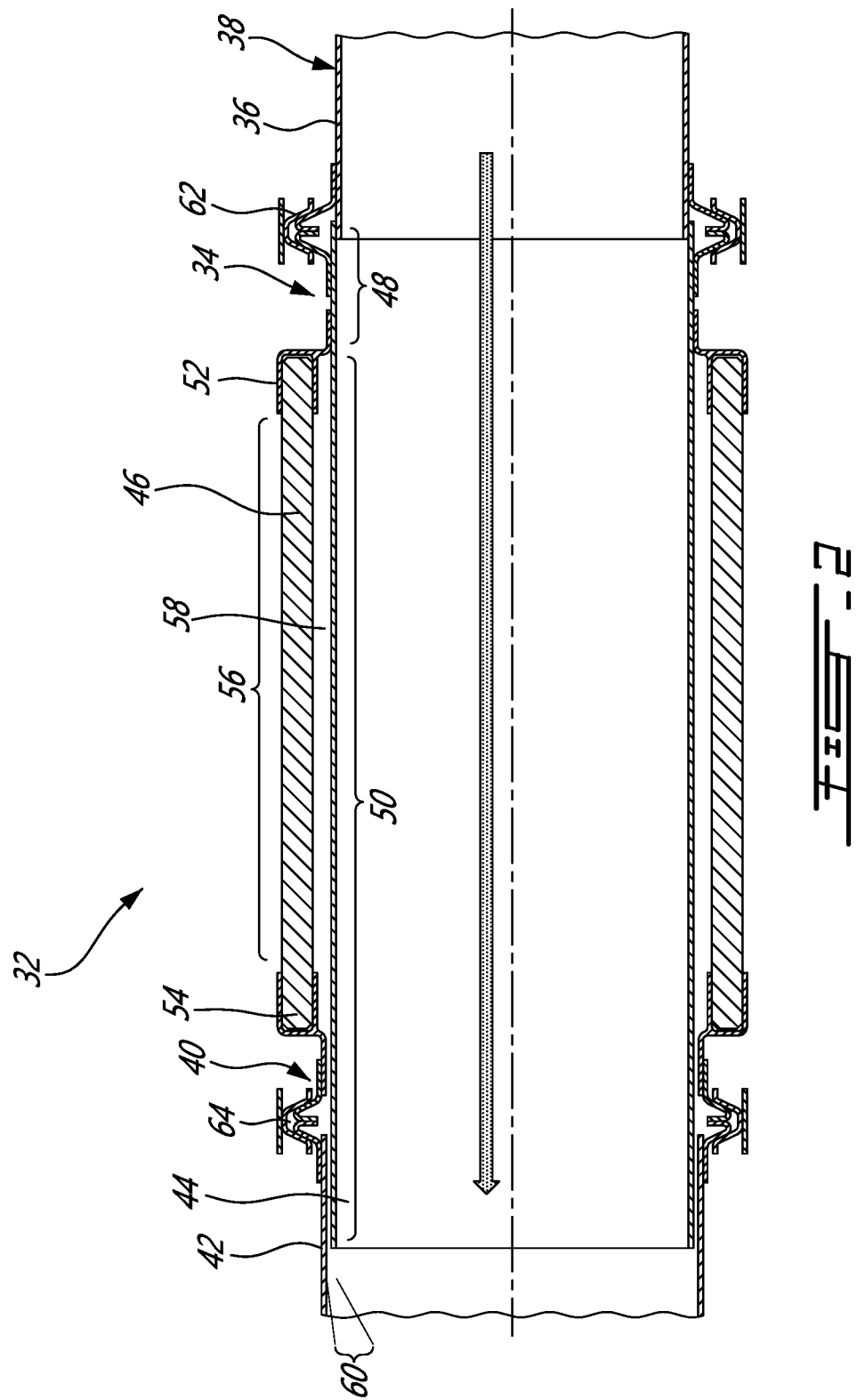
FIG. 2 is a cross-sectional view of a damper segment in accordance with a first embodiment.

Either one of the exhaust pipe 22 and the intake pipe 19 can be referred to as a pressurized gas pipe. Either one, or both pressurized gas pipes can be straight, continuously curved, or made of straight sections interconnected via one or more elbows, to name some examples. The pressurized gas pipes can be said to have a length, and to defining a gas path extending inside along the length. Either one, or both pressurized gas pipes can have a damper segment 32 located along a portion of the length. A first example of a damper segment 32 is presented in greater detail in FIG. 2.

In this example, the damper segment 32 is, like the remainder of the pressurized gas pipe, generally tubular in shape. By convention in the context of this specification, the expression "proximal" will be used to refer to the leading side, i.e. direction of incoming gas, whereas the expression "distal" will be used to refer to the trailing side, i.e. the direction of gas evacuation. Accordingly, the damper segment 32 can be said to have a proximal end 34 connected to a proximal segment 36 of the pressurized gas pipe 38, and a distal end 40 connected to a distal segment 42 of the pressurized gas pipe 38. In this embodiment, both the proximal segment 36 and the distal segment 42 are rigid. The damper segment 32 has a rigid tube 44 and a damper tube 46. More specifically a first portion of the rigid tube 44 which will be referred to herein as the connector portion 48 is secured to the proximal segment 36, and a second portion of the rigid tube 44 referred to herein as the liner portion 50 projects from the connector portion 48 in the direction of gas flow and reaches the distal segment 42. More specifically, the liner portion 50 penetrates into the distal segment 42 to a certain extent, in this embodiment. The damper tube 46 extends around the liner portion 50 along a portion of the length of the liner portion 50.

The damper tube 46 also has a proximal end and a distal end. The proximal end of the damper tube 46 is supported by a proximal catch 52, which connects the proximal end of the damper tube 46 to the rigid tube 44, and more specifically to the connector portion 48 of the rigid tube 44. The distal end of the damper tube 46 is supported by a distal catch 54. The distal catch 54 is structurally connected between a distal end of the damper tube 46 and the distal segment 42. More specifically, in this embodiment, the distal catch 54 forms part of a rigid component which is secured to the distal segment 42. The damper tube 46 has an unsupported length 56 extending between the distal catch 54 and the proximal catch 52. In other words, an annular gap 58 is provided between the unsupported length 56 of the damper tube 46 and the liner portion 50 of the rigid tube 44. This gap 58 provides room for the unsupported length 56 of the damper tube 46 to move and oscillate into.

The damper tube 46 is made of a metal mesh. The metal mesh can have a plurality of ply. The metal mesh can be tightly braided. The damper tube 46 can be heat-resistant, pressure-resistant and air tight. The damper tube 46 can be supple. The liner portion 50 of the rigid tube 44 can act as the delimitation of the gas path, while being structurally disconnected from the distal segment 42 at the distal end 40, whereas the damper tube 46 can form a portion of the structural connection between the proximal segment 36 and the distal segment 42. Accordingly, the damper segment 46 can allow to accommodate some degree of relative movement between the proximal segment 36 and the distal segment 42. More specifically, upon relative lengthwise displacement, the liner portion 50 of the rigid tube 44 can slide deeper into or retract from the distal segment 42, and the damper tube 46 can compress or expand. Upon transversal displacement, the distal end of the liner portion 50 can, to a certain extent, move transversally within the distal segment 42. More specifically, a gap 60 can be provided between the distal end of the liner portion 50 and the proximal end of the distal segment 42, and transversal movement can close the gap on one side while opening the gap on the other side, for instance. The gap 60 can be permanent, or temporary. For instance, in some engine conditions (e.g. max power), the gap 60 can be designed to close whereas it can be designed to open in some other engine conditions (e.g. idle or off). Upon transversal relative movement, the unsupported length of the damper tube 46 can bend to a certain, for instance. Moreover, the damper tube 46 can be designed to provide a damping dynamic behavior. Indeed, if one of the proximal segment 36 and the distal segment 42, or both the proximal segment 36 and the distal segment 42 vibrate, the unsupported length 56 of the damper tube 46 can serve to absorb some or all of the vibrational energy in a manner to prevent or limit the transmission of vibrational energy from the proximal segment 36 to the distal segment 42 or vice versa.

There are different ways by which the proximal end 34 and the distal end 40 of the damper segment 32 can be secured to the corresponding one of the proximal segment 36 and the distal segment 42. In the example embodiment presented in FIG. 2, both the proximal end 34 and the distal end 40 are secured to the corresponding one of the proximal segment 36 and the distal segment 42 with corresponding V-Band clamps 62, 64. The V-Band clamps 62, 64 can be embodied as generally annular components having a radially-inwardly facing channel which is generally shaped as a V. On the other hand, both components to be secured can be provided with a corresponding outwardly sloping flange, and prior to assembly, the components can be positioned in a manner for the opposite faces of the flanges to become engaged into contact with one another. An opening can be provided around the circumference of the V-Band clamp and a fastener such as a bolt can be selectively positioned across the opening and tightened in a manner to close the opening, thereby engaging faces of the V-shaped channel with corresponding sloping faces of the flanges, wedging the flanges against one another, with the V-shaped channel acting as a retainer. V-Band clamps can be an interesting choice to connect the damper segment 32 to one, or both adjacent segments 36, 42, in the illustrated embodiment, since they can be less rigid than other forms of structural connections and therefore provide for some degree of damping themselves.

Figure 3:
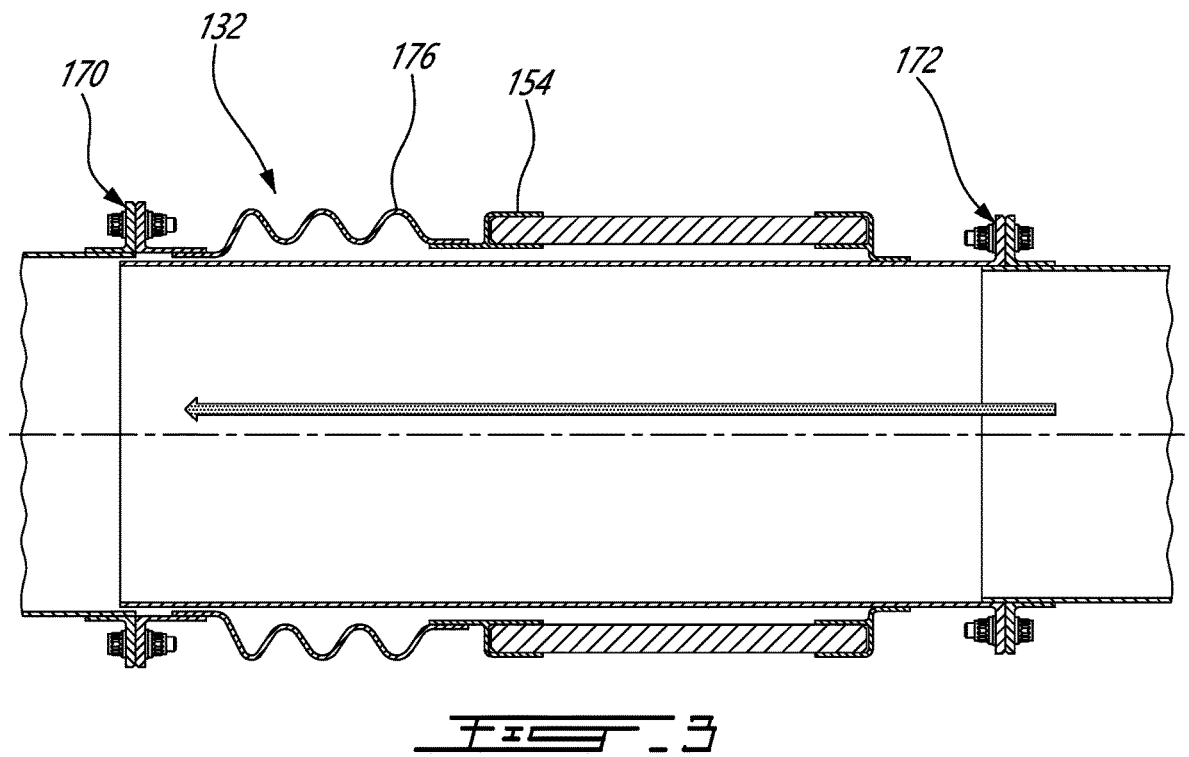
FIG. 3 is a cross-sectional view of a damper segment in accordance with a second embodiment.
Figure 4:
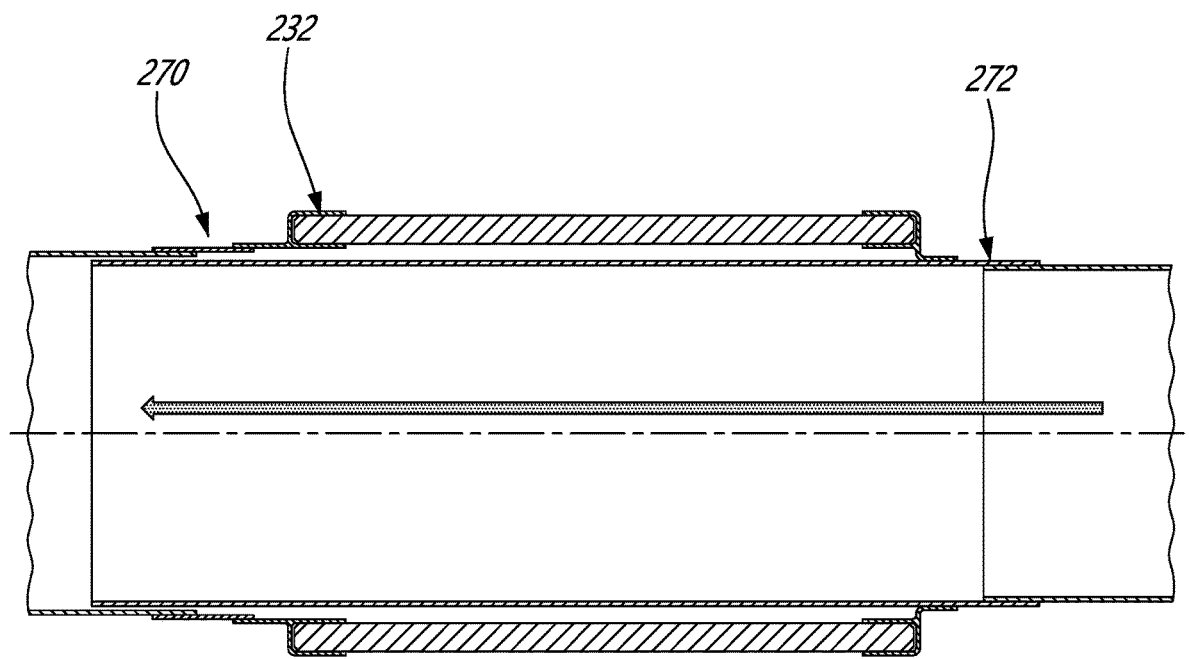
FIG. 4 is a cross-sectional view of a damper segment in accordance with a third embodiment.

Turning to FIG. 3, an embodiment of a damper segment 132 having a bolt and flange type connection, i.e. a connection in the form of a bolted flange arrangement 170, 172, at both the proximal end and the distal end of the damper tube is presented. Turning to FIG. 4, an embodiment of a damper segment 232 having a welded connection 272, 270 at both the proximal end and the distal end of the damper tube is presented. The welded connection can be the stiffest type of connection amongst the three illustrated types, whereas the bolt and flange connection can have a stiffness intermediary to the welded connection and to the V-Band clamp connection. In some embodiments, a different type of structural connection can be used at the proximal end and at the distal end.

Returning to FIG. 3, an embodiment of a damper segment 132 is presented wherein the distal catch is indirectly structurally connected between the distal end of the damper tube and the distal segment. More specifically, the distal catch 154 is structurally connected to the distal segment via an undulated flexible tubing 176, sometimes referred to in the art as a "bellows". The undulated flexible tubing 176 can be designed to provide further accommodation of relative displacements between the proximal segment and the distal segment, for instance. In an alternate embodiment, an undulated flexible tubing can be provided between the proximal catch and the proximal end of the damper tube. It will be noted in this embodiment that the undulated flexible tubing is provided as a portion of the structural path between the proximal segment and the distal segment, and is thus provided "in series", so to speak, with the damper tube, and not "in parallel" with the damper tube.

Figure 5:
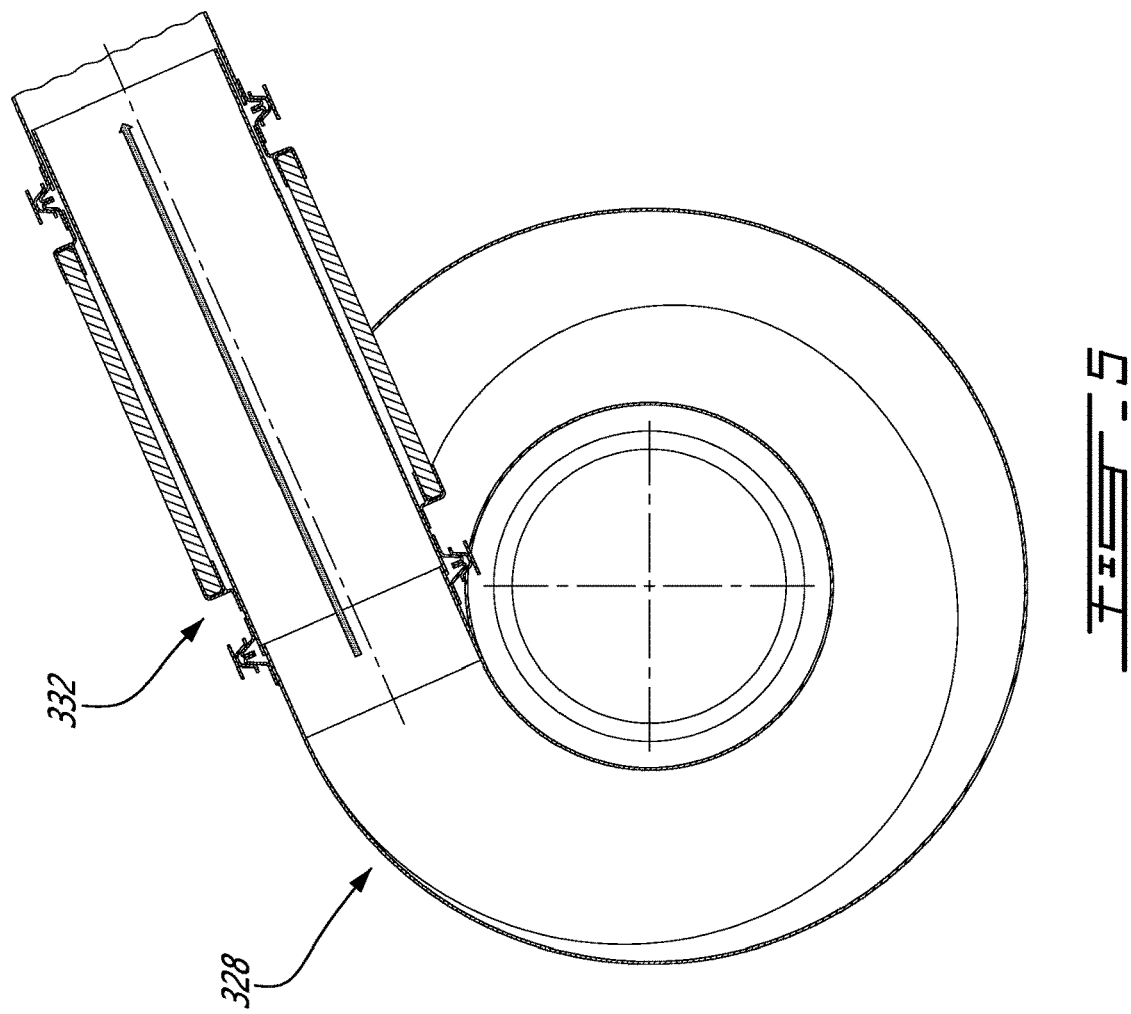
FIG. 5 is a cross-sectional view of a damper segment in accordance with a fourth embodiment.

FIG. 5 presents yet another embodiment of a damper segment 332. In this embodiment, the damper segment 332 is secured to a tangential outlet of a compressor scroll 328. Accordingly, in this embodiment, the proximal segment of the pressurized gas pipe is embodied as a tubular portion of the compressor scroll 328 itself. FIG. 5 is thus different from the embodiments presented in FIGS. 2, 3 and 4 and where the damper segment is located at an intermediary location of the pressurized gas pipe as opposed to at or near an end of the pressurized gas pipe.

Figure 6:
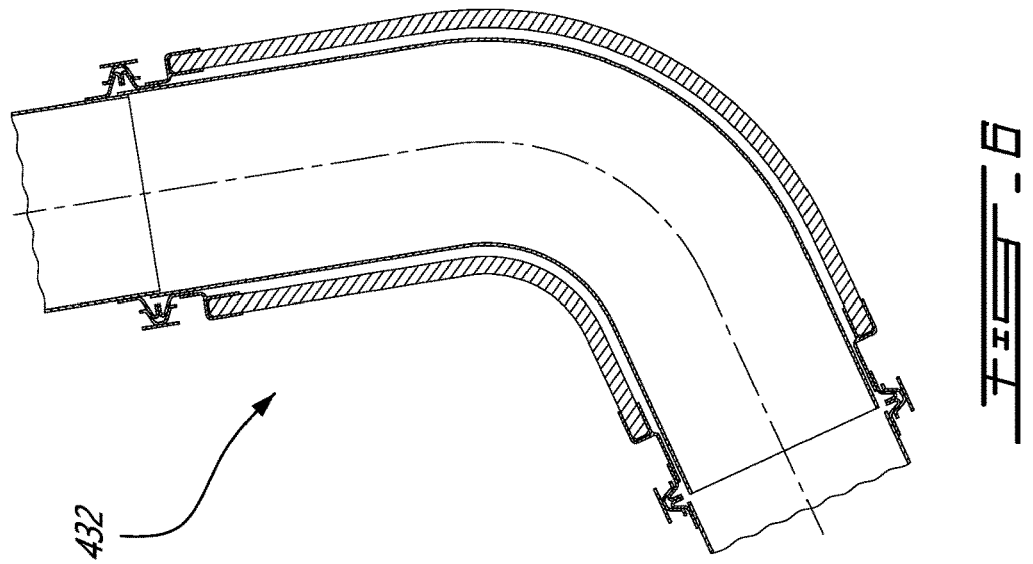
FIG. 6 is a cross-sectional view of a damper segment in accordance with a fifth embodiment.

FIG. 6 presents yet another embodiment where the damper segment 432 is provided in the form of an elbow as opposed to in the form of a straight segment.

The embodiments described in this document provide non-limiting examples of possible implementations of the present technology. Upon review of the present disclosure, a person of ordinary skill in the art will recognize that changes may be made to the embodiments described herein without departing from the scope of the present technology. For example, the tubular segment, as the remainder of the pressurized gas pipe, can have different cross-sectional shapes such as circular, oval or even square to name some examples. Yet further modifications could be implemented by a person of ordinary skill in the art in view of the present disclosure, which modifications would be within the scope of the present technology.

The invention claimed is:

1. An aircraft engine comprising a combustion engine having an engine intake and an exhaust gas outlet; a gas turbine having a gas turbine intake; an exhaust pipe fluidly connecting the exhaust gas outlet to the gas turbine intake, the exhaust pipe having a length defined between the exhaust gas outlet and the gas turbine intake and an exhaust gas path extending inside the exhaust pipe along the length, the exhaust pipe having a damper segment located along a portion of the length, the damper segment having
   a proximal end secured to a proximal segment and directed towards the combustion engine relative the exhaust gas path,
   a distal end secured to a distal segment and directed towards the gas turbine intake along the exhaust gas path,
   a rigid tube at the proximal end,
   a damper tube extending between the rigid tube and the distal end, the damper tube being made of a metal mesh,
   a proximal catch connecting a proximal end of the damper tube to the rigid tube, and
   a distal catch structurally connected between a distal end of the damper tube and the distal segment, the damper tube having an unsupported length extending between the distal catch and the proximal catch,
   the rigid tube having a liner portion projecting into the distal segment, the liner portion extending internally relative the damper tube.

2. The aircraft engine of claim 1 further comprising an annular gap between a distal end of the liner portion and the distal segment.

3. The aircraft engine of claim 1 wherein the metal mesh is a braided steel mesh having at least one ply.

4. The aircraft engine of claim 1 wherein at least one of the proximal end and of the distal end is secured to a corresponding one of the proximal segment and the distal segment via a V-Band clamp.

5. The aircraft engine of claim 1 wherein at least one of the proximal end and of the distal end is secured to a corresponding one of the proximal segment and the distal segment via a bolted flange arrangement.

6. The aircraft engine of claim 1 wherein the damper segment forms an elbow in the exhaust pipe.

7. An aircraft engine comprising a combustion engine having an engine intake and an exhaust gas outlet; a compressor having a compressor outlet; an intake pipe fluidly connecting the compressor outlet to the engine intake, the intake pipe having a length defined between the compressor outlet and the engine intake and an intake gas path extending inside the intake pipe along the length, the intake pipe having a damper segment located along a portion of the length, the damper segment having
   a proximal end secured to a proximal segment and directed towards the compressor outlet relative the intake gas path,
   a distal end secured to a distal segment and directed towards the engine intake along the intake gas path,
   a rigid tube at the proximal end,
   a damper tube extending between the rigid tube and the distal end, the damper tube being made of a metal mesh,
   a proximal catch connecting a proximal end of the damper tube to the rigid tube, and
   a distal catch structurally connected between a distal end of the damper tube and the distal segment, the damper tube having an unsupported length extending between the distal catch and the proximal catch, the rigid tube having a liner portion projecting into the distal segment, the liner portion extending internally relative the damper tube.

8. The aircraft engine of claim 7 further comprising an annular gap between a distal end of the liner portion and the distal segment.

9. The aircraft engine of claim 7 wherein the metal mesh is a braided steel mesh having at least one ply.

10. The aircraft engine of claim 7 wherein at least one of the proximal end and of the distal end is secured to a corresponding one of the proximal segment and the distal segment via a V-Band clamp.

11. The aircraft engine of claim 7 wherein at least one of the proximal end and of the distal end is secured to a corresponding one of the proximal segment and the distal segment via a bolted flange arrangement.

12. The aircraft engine of claim 7 wherein the damper segment forms an elbow in the intake pipe.

13. A damper segment for assembly between adjacent segments of a pressurized gas pipe relative to a pressurized gas path, the damper segment comprising:
 a proximal end,
 a distal end,
 a rigid tube at the proximal end,
 a damper tube extending between the rigid tube and the distal end, the damper tube being made of a metal mesh,
 a proximal catch structurally connecting a proximal end of the damper tube to the rigid tube, and
 a distal catch structurally connected between a distal end of the damper tube and the distal end, the damper tube having an unsupported length extending between the distal catch and the proximal catch,
 the rigid tube having a liner portion projecting into the distal end, the liner portion extending internally relative the damper tube.

14. The damper segment of claim 13 further comprising an annular gap between the unsupported length of the damper tube and the liner portion of the rigid tube.

15. The damper segment of claim 13 wherein the metal mesh is a braided steel mesh having at least one ply.

16. The damper segment of claim 13 wherein at least one of the proximal end and of the distal end has an outwardly sloping flange configured for use with a V-Band clamp.

17. The damper segment of claim 13 wherein at least one of the proximal end and of the distal end has an outwardly projecting flange forming a component of a bolted flange arrangement.

18. The damper segment of claim 13 wherein the damper segment forms an elbow.

19. The damper segment of claim 13 wherein the damper segment has a circular cross-sectional shape.

20. The damper segment of claim 13 further comprising a bellows structurally connected between the distal catch and the distal end.

* * * * *